INVENTOR
H. J. DESMET
BY Curphey + Erickson
PATENT AGENTS

INVENTOR
H.J. DeSMET
BY Curphey & Erickson
PATENT AGENTS

TOP

BACK

SIDE

CARD 12

BOTTOM

CARD 12a

INVENTOR
H.J. DeSmet
BY Curphey & Erickson
PATENT AGENTS

United States Patent Office 3,509,301
Patented Apr. 28, 1970

3,509,301
CROSSPOINT ACTUATING DEVICE FOR A CROSSPOINT SWITCH WITH FIXED STOP MEMBER VIBRATION DAMPING MEANS
Herman De Smet, Ottawa, Ontario, Canada, assignor to Northern Electric Company Limited, Montreal, Quebec, Canada
Filed Nov. 22, 1967, Ser. No. 685,127
Int. Cl. H01h 63/33, 67/26
U.S. Cl. 200—177                                      6 Claims

ABSTRACT OF THE DISCLOSURE

An apparatus which provides fixed stop members integrated with crosspoint actuating cards for damping the vibration of select fingers when the fingers are released from an operated position. The crosspoint actuating cards have a pair of fixed stop members in the form of projections which define a U-shaped channel for limiting the movement of the fingers to prevent their striking other movable members and to generally increase the operating speed of the overall crosspoint switch.

---

This invention relates to a crosspoint actuating device for a crossbar switch and is an improvement over the invention described in R. L. Peek Jr.'s copending U.S. application Ser. No. 449,51, filed Apr. 19, 1965.

Crossbar switches are widely used in communication switching system for interconnecting large numbers of electrical circuits. In a typical crossbar switch, a number of so-called select magnets are each associated with individual horizontal levels of crosspoints. Operation of a select magnet causes a select bar at its associated horizontal level to rotate about its longitudinal axis. Each select bar carriers a number of elongated, resilient finger members which rotate with the select bar into their operated positions at all crosspoints in that horizontal level.

A number of so-called hold magnets are each associated with individual vertical columns of crosspoints. When a finger member at a horizontal level is in its operated position, it is interposed between the hold magnet actuator of a vertical column and a crosspoint actuating card at the horizontal level. During subsequent operation of the hold magnet of the vertical column, the one operated finger member in that column becomes trapped between the actuator and the actuating card. Movement of the card operates the crosspoint which contains a number of pairs of electrical contacts.

Upon release of the select magnet, the remaining finger members of this horizontal level are returned to their unoperated positions by the select bar, but the operated finger member is held by the actuator in the operated crosspoint. Subsequent release of the hold magnet releases the operated crosspoint and the released finger member returns to its unoperated position.

More recently, it has been found convenient to use a single select bar for each adjacent pair of select magnets and their associated horizontal levels. Rotation of a select bar in opposite directions about its longitudinal axis permits rotation of finger members into their operated positions in each of two adjacent horizontal levels.

It is important that crossbar switch contacts of a selected crosspoint operate quickly, and that correct crospoints are selected, if efficient and economical communications service is to be provided. Known crossbar switches of the type briefly referred to above have proven fast in operation, but difficulties have been encountered in ensuring accurate positioning of the finger members. These finger members are also, by necessity, quite flexible and require only a small amount of energy to cause them to vibrate with such a wide amplitude that no crosspoint or a wrong crosspoint could be selected.

One known way to avoid wrong crosspoint selection was to cause the control circuitry of the switch to provide a delay after operation of the select magnet to allow the vibration of the finger member to cease before operation of the hold magnet.

The finger members also tended to vibrate upon return to their unoperated positions after release of the select or hold magnets. This problem has been overcome in the past by providing a vibration damping device for the finger members and by causing the control circuitry of the switch to provide long delays following the release of the select and hold magnets before subsequent switch operations were started.

The problem of introducing the above-mentioned delays was that the traffic carrying capacity of the crossbar switches was reduced. Also, the known vibration damping devices for the finger members which used impact damping or deflection techniques have not been completely successful.

The above-mentioned Peek application took a significant step toward reducing the problem associated with finger member vibration by supporting the finger members independently of the select bar and by providing elongated rigid members having one end attached to the select bar for operating the finger members. The free ends of these L-shaped rigid members were interposed between a pair of independently supported finger members such that the finger members engaged, and were in the path of rotation of, the bases of the L-shaped members. As the L-shaped members rotated, they flexed the finger members into their operated positions, and this positive action by the L-shaped members reduced the tendency of the finger members to vibrate as they did when mounted directly on the movable bar.

The Peek invention also eliminated the requirement for separate impact damping mechanisms for the finger members when they returned to their unoperated positions. With the select bar in its unoperated position, the rigid members acted as stops to provide damping for the finger members. Thus, with the problem of vibration reduced, the traffic carrying capacity of a crossbar switch was increased by reducing the delay between the operation of the select magnet and the hold magnet, and between the release of these magnets and commencement of further switch operations.

Although providing a marked improvement over known crossbar switches, the above-mentioned Peek application still suffered from some shortcomings. Since the L-shaped members were themselves movable members, they could be in motion when a finger member was released to return to its unoperated position. This detracted from the use of the L-shaped members as vibration dampers. In adidtion, there would be no vibration damping available when an L-shaped member was already operated in one direction to operate one finger member if its other associated finger member—which was already operated and held by its hold magnet—then returned to its unoperated position upon release of the hold magnet in the same vertical column.

In the design of present day crossbar switches, it is very important that the switches be as compact and as light as possible. This reduces floor space requirements for mounting the switches and lessens the floor load per unit area. Such a miniature crossbar switch design makes it very desirable, if not mandatory, to make adjustments on a sub-assembly basis during manufacture.

Problems in making such adjustments became evident in the manufacture of the mechanism of the above-mentioned Peek application. With the finger members mounted independently of the L-shaped rigid member and hence of the select bar, the finger members could be located approximately with respect to the actuators and cards and adjusted on a sub-assembly basis. However, when the select bar was added in the final assembly of the crossbar switch, the L-shaped members determined the final position of the finger members. This resulted in problems with keeping associated finger members parallel to each other and in avoiding crossovers.

The present invention provides improved vibration damping for the finger members without using up additional valuable space in the design of a miniature crossbar switch. Moreover, the adjustment of the finger members, actuators and crosspoint actuating cards can be made on a sub-assembly basis during manufacture while avoiding problems associated with keeping the finger members parallel and with crossovers.

According to this invention, a rigid member is attached to the select bar as in the above-mentioned Peek application. However, the rigid member does not serve as a stop member for the finger members. Instead, the rigid member is disposed between the finger members in spaced relation when the select bar is in its unoperated position and a first stop member is provided as an integral part of each crosspoint actuating card facing the actuator. Each finger member, when in its unoperated position, is tensioned against the stop member of its associated card such that the finger members extend in separated, substantially parallel relation. In practice, the finger members diverge slightly from their supported ends to their free ends. When either finger member moves from its operated to its unoperated position, it strikes its associated stop member without engaging the rigid member, each stop member thereby damping the tendency of its associated finger member to vibrate.

The rigid members are thus advantageously used to provide the positive action desired upon operation of the finger members. Improved vibration damping is provided by the stop members on the crosspoint actuating cards. By making the stop members an integral part of the crosspoint actuating cards (which are essential parts of the crossbar switch anyway) no additional space is wasted. The importance of conserving space will be better appreciated when it is realized that each vertical unit of a 200 crosspoint switch contains 5 pairs of crosspoint actuating cards.

According to another aspect of this invention, each card is provided with a second stop member integral with the card and facing the actuator. Each second stop member is disposed in spaced parallel relation to its associated first stop member. The second stop members of each card determine the extent of movement of its associated finger member to its operated position.

The first and second stop members of each card preferably comprise elongated parallel projections extending from the card toward the actuator. A flat surface joins the projections of each card at right angles to form a U-shaped channel facing the actuator. Each finger member is located to move between its unoperated and operated positions parallel to, but slightly spaced from the flat surface of its associated card between the projections and within the channel. Thus, when a finger member is in its operated position and the actuator is then moved to its operated position, the operated finger member is trapped between a surface of the actuator and the flat surface of the card.

Associated finger members, crosspoint cards and actuators preferably form part of the same vertical unit of the crossbar switch. The finger members are advantageously constructed in five planes to properly position them in the vertical unit and to prevent them, upon release, from jumping over the L-shaped member and ending upon the wrong side of it.

The provision of two stop members on each card joined by a flat surface to form a U-shaped channel facing the actuator helps to confine the finger members and to determine the extent of their movement. In addition, more certain actuation of the crosspoints is guaranteed upon operation of the cards because the finger members are trapped between a single surface of the card and of the actuator rather than across a slot as was the case in prior art switches. Making the finger members, crosspoints, actuator and cards part of the same vertical unit, which is completely adjustable on a sub-assembly basis, facilitates the position of the finger members with respect to the actuator and cards and avoids crossovers. This provides a distinct manufacturing advantage.

To minimize the space occupied by the cards, the first and second projections of one card are in the same plane while the first and second projections of the other card are in a different plane to each other. The first projections of the two cards are located in spaced overlapping relation.

It is also important that the lateral movement of the cards is kept to a minimum to insure a good damping effect by the stop members. According to this invention, means are provided in the mounting arrangement of the cards to minimize the lateral movement without a rigid mounting.

A novel crosspoint actuating card structure and a novel finger member are other advantageous features provided by this invention.

A preferred embodiment of this invention will now be described, by way of example, with reference to the accompanying drawings in which.

Figure 1:
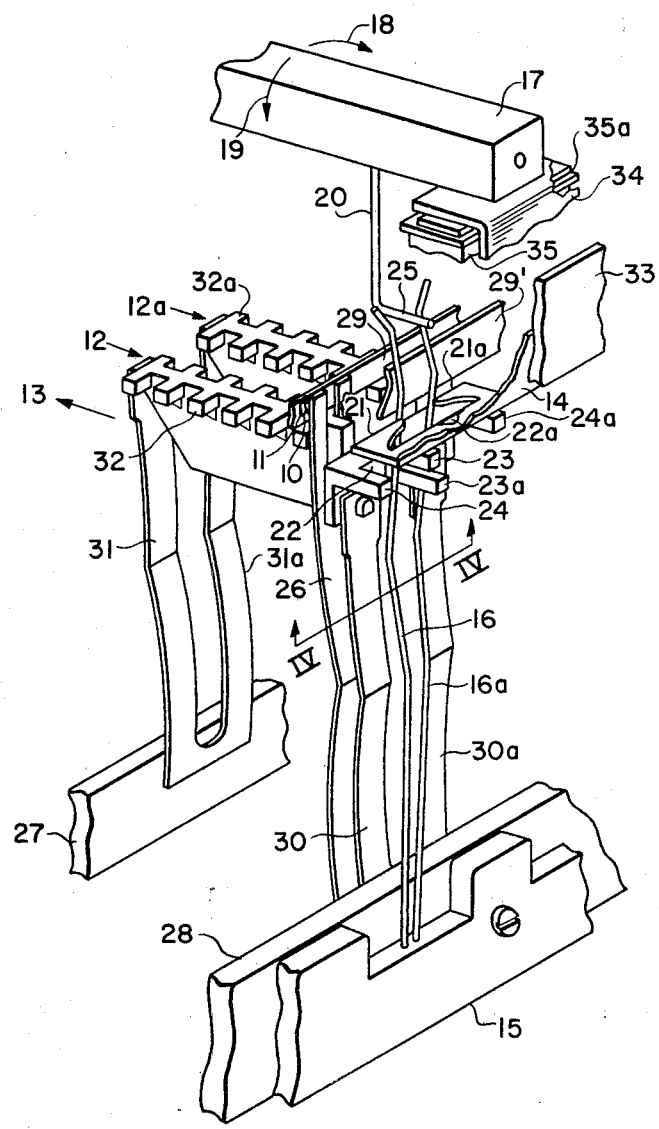
FIGURE 1 is a perspective view of a portion of a crosspoint actuating device of a crossbar switch in its unoperated position with certain parts broken away for clarity.
Figure 2:
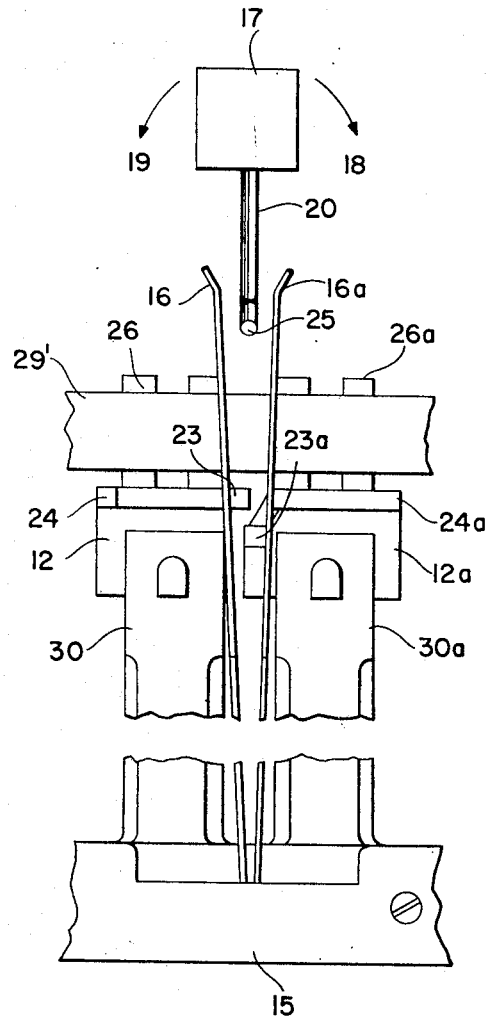
FIGURE 2 is a front view of FIGURE 1 with certain parts deleted and broken away for clarity.
Figure 3:
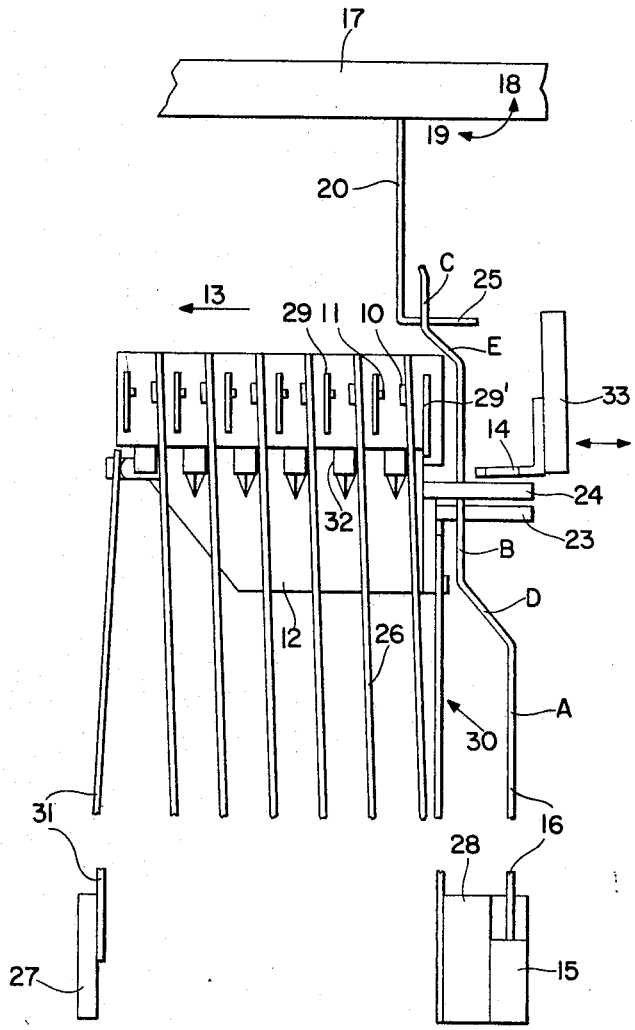
FIGURE 3 is a side view of FIGURE 1 with certain parts deleted and broken away for clarity.

FIGURES 1 to 3 of the drawings show a crosspoint actuating device, according to this invention, in its unoperated condition. First and second crosspoints are each shown as including at least one pair of electrical contacts 10, 11 and 10a, 11a respectively. First and second crosspoint actuating cards 12, 12a, one associated with each crosspoint, each has an unoperated and an operated position and is movable to its operated position in the direction of the arrow 13 to operate its associated crosspoint. An actuator 14 has an unoperated and an operated position and is movable to its operated position toward the cards in the direction of the arrow 13. An insulated support member 15 fixedly supports one end of first and second elongated resilient finger members 16, 16a whose shanks are interposed between the actuator 14 and the cards 12, 12a with one finger member being associated with each card.

A movable bar 17 is mounted independently of the finger members 16, 16a (normally to the framework of the switch), and is arranged to rotate about its longitudinal axis in opposite directions as shown by the arrows 18 and 19 from an unoperated position as shown, to first and second operated positions. An elongated rigid member 20 has one end attached to the bar 17 to rotate with rotation of the bar. Each finger member 16, 16a has an unoperated and an operated position and is movable in opposite directions to its respective operated position. The other end of the rigid member 20 is interposed between the finger members 16, 16a such that each finger member is flexed to its operated position when the bar is rotated to its respective operated positions. The actuator 14 has surface means 21, 21a and the cards 12, 12a have surface means 22, 22a (see FIGURES 1 and 4)

for cooperation with the finger members 16, 16a such that movement of the actuator 14 to its operated position, when either of the finger members 16, 16a is in its operated position, will trap the operated finger member between its associated card and the actuator, to cause the card to move to its operated position to operate its associated crosspoint.

According to this invention, each card 12, 12a is provided with a first stop member 23, 23a integral with each card and facing the actuator 14. Each finger member 16, 16a, when in its unoperated position, is tensioned against the stop member 23, 23a of its associated card such that the finger members 16, 16a extend in separated, substantially parallel relation. In practice, as shown in FIGURE 2, the finger members 16, 16a diverge slightly from the support member 15 to their free ends. The free end of the rigid member 20 is disposed between the finger member 16, 16a in spaced relation when the bar 17 is in its unoperated position. Thus, according to this invention, when either finger member 16 or 16a returns from its operated to its unoperated position, it strikes its associated stop member 23 or 23a without engaging the rigid member 20, each stop member 23, 23a thereby damping the tendency of its associated finger member to vibrate.

Each card 12, 12a includes a second stop member 24, 24a each integral with its associated card and facing the actuator 14. Each stop member 24, 24a is disposed in spaced parallel relation to its associated first stop member 23, 23a such that each second stop member 24, 24a determines the extent of movement of its associated finger member 16, 16a to its operated position.

The first and second stop members 23 and 24 of card 12 and 23a and 24a of card 12a preferably comprise elongated parallel projections extending from the card toward the actuator 14. The surface means 22, 22a of each card is a flat surface which joins the projections 23, 24 and 23a, 24a of each card at right angles to form a U-shaped channel facing the actuator 14.

Each finger member 16, 16a is located to move between its unoperated and operated positions parallel to, but slightly spaced from, the flat surface 22, 22a of its associated card 12, 12a between the projections 23, 24 and 23a, 24a. The surface means 21, 21a of the actuator 14 comprise flat surfaces parallel to and facing the flat surfaces 22, 22a of each card 12, 12a in a plane parallel to, but displaced from, the projections.

When finger member 16, for example, is in its operated position as a result of movement of member 20, and the actuator 14 is then moved from its unoperated to its operated position, (see FIGURES 4b and 4c), the operated finger member 16 is trapped between the flat surfaces 21 of the actuator 14 and surface 22 of card 12. This causes the card 12 to move in the direction of arrow 13 to its operated position to operate its associated crosspoint. A similar operation results when finger member 16a is in its operated position.

As will be described in more detail hereinafter, the finger members 16, 16a, the crosspoints, the actuator 14 and the cards 12, 12a all form part of the same vertical unit of the crossbar switch whereby the location of the finger members with respect to the cards and the actuator can be adjusted on a sub-assembly basis.

Figure 5A:
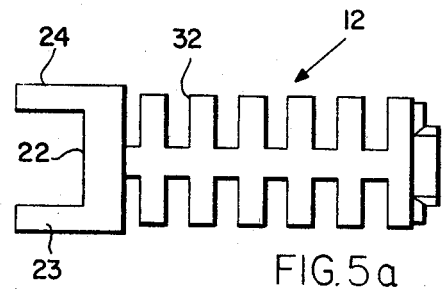
FIGURES 5a to 5f are separate views of the actuating cards per se.
Figure 5B:
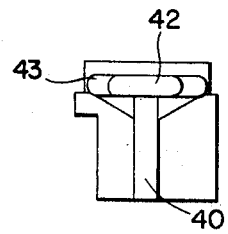
Figure 5C:
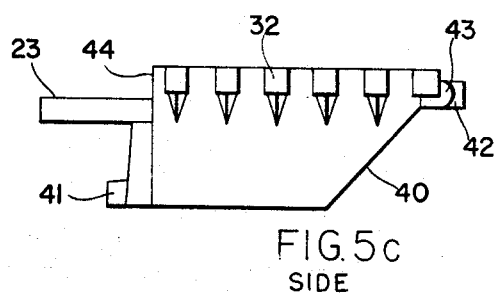
Figure 5D:
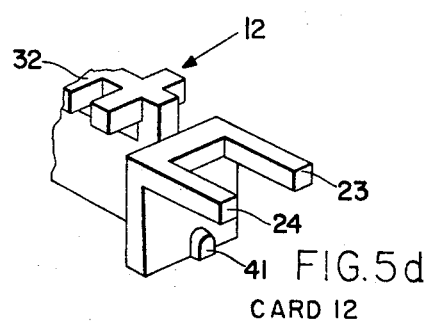
Figure 5E:
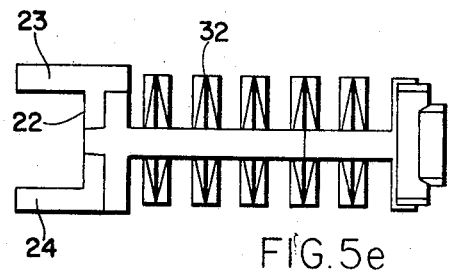
Figure 5F:
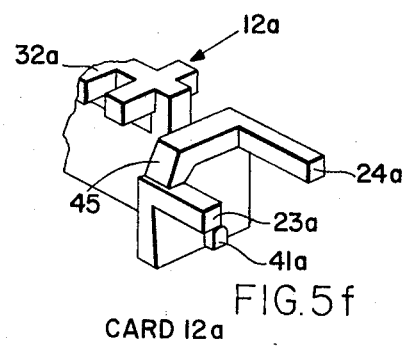

It is to be noted that in card 12 the first projection 23 is disposed in the same plane as the second projection 24a in card 12a while the first projection 23a is disposed in a different plane from the second projection 24a (see FIGURES 5d and 5f). The first projections 23 and 23a of the cards 12 and 12a are located in spaced overlapping relation, thus minimizing the space occupied by the cards. However, where space limitations are not critical, all four projections can be disposed in the same plane.

The rigid member 20 is preferably substantially L-shaped with the base 25 of the L being located in spaced relation between the finger members 16, 16a near their free ends when the bar 17 is in its unoperated position (see FIGURES 2 and 4). The free ends of the finger members are fanned out slightly for facilitating the location of the base 25 in the final assembly of the crossbar switch.

The contacts 10, 10a are movable and are carried by spring members 26, 26a (see FIGURES 1 to 3) which can be mounted in a pile-up between plates 27 and 28 with the plate 28 preferably forming part of the core of the hold magnet of a vertical unit of the crossbar switch. The fixed contacts 11, 11a can be arranged as described in U.S. Patent 3,297,850 to R. L. Peek Jr. et al. granted Jan. 10, 1967, or preferably carried by metallic strips 29 which can be supported in a molded block (not shown) as part of the same vertical unit. The springs 26, 26a are preferably predeflected against the strips 29 so that the contacts 10 will mate with the contacts 11 with the desired contact force in their operated positions.

The cards 12, 12a are mounted side-by-side by retaining and restoring springs 30, 30a and 31, 31a respectively, with the springs 30 and 31 being supported in the pile-up by the plates 28 and 27 respectively. The springs 30 and 31 provide a pantograph mounting for the cards 12. The cards 12, 12a have spaced-apart teeth 32, 32a extending across their length at substantially right angles to define walls for containing the movable contact springs 26, 26a. In the unoperated positions of the cards 12, 12a (see FIGURE 3), the tension in the restoring springs 31, 31a urges the walls defined by the teeth 32, 32a of the cards against the springs 26, 26a, thereby keeping the movable contacts 10, 10a and the fixed contacts 11, 11a apart. The strip 29 acts as a back-stop for the card.

When operated, the cards 12, 12a are movable in the direction of the arrow 13 against the tension of the springs 31, 31a to cause the walls defined by the teeth 32, 32a to lift off the spring members 26, 26a thereby permitting contacts 10, 10a to mate with the contacts 11, 11a.

The actuator 14 is attached to a hold magnet armature 33 and moves in the direction of the arrow 13 to its operated position upon operation of the hold magnet.

The support member 15 for the finger member 16, 16a is preferably a molded block mounted against the plate 28 as best shown in FIGURE 1. The fingers 16, 16a are constructed in five planes for proper location in the assembly and to prevent them upon release, from jumping over the base 25 of the member 20 and ending up on the wrong side of it.

As shown in FIGURE 3 each finger member has five straight sections. The first section A has one end fixedly supported by the member 15. The second section B extends parallel to, but in a different plane from the first section and locates the finger members properly for cooperation with the cards 12 and the actuator 14. The third section C extends parallel to, but in a different plane from, the first and second sections A and B on the side of the second section B remote from the first section A. The third section C locates the finger members properly for cooperation with the base 25 of the member 20. The fourth section D joins the other end of the first section A to one end of the second section B and the fifth section E joins the other ends of the second section B to one end of the third C section. At least one of the two angles formed between each of the first and fourth sections A and D, the second and fourth sections B and D, the second and fifth sections B and E, and the third C and E and fifth sections are obtuse.

Although a relatively complex finger member with five sections can be more expensive to manufacture than a more simple finger member, this construction offers some distinct advantages. The use of five sections allows a greater free length of the finger members. This permits the use of a larger diameter finger member for a given amount of required wire stiffness. The larger the diameter of the finger member, the easier it is to make and handle. In addition, more control over stiffness tolerance is achieved making for a better overall balanced design. With the second section B being displaced from the first section A, a torsional action is applied to the finger member 16 when it strikes the projection 23 thereby improving the damping action.

The movable bar 17 serves as a select bar of the crossbar switch and rotates in the direction of the arrows 18 or 19 to its operated positions when an armature 34 is attracted by a select magnet 35 or 35a (see FIGURE 1).

Figure 4A:
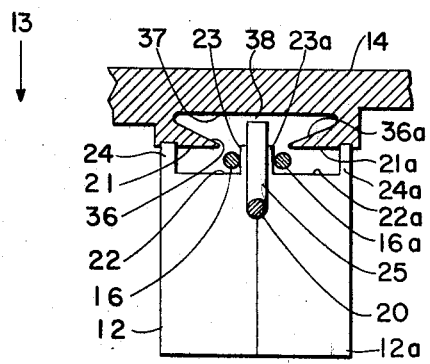
FIGURES 4a to 4d are sections taken along IV–IV of FIGURE 1 showing different operating conditions of the actuating mechanism.
Figure 4B:
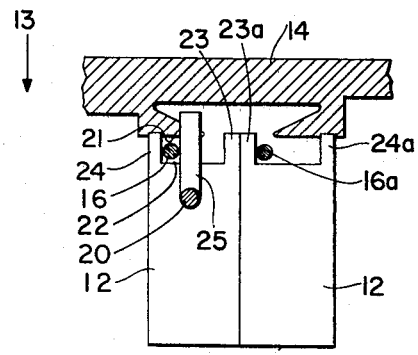

Reference will now be made to the views of FIGURE 4 to obtain an undertsanding of the details of the crosspoint actuating device and its operation. The actuator 14 in addition to having flat surfaces 21, 21a comprises surfaces 36, 36a extending from and sloping away from the surfaces 21, 21a from a position adjacent to, but spaced from, the unoperated positions of the finger members 16, 16a. The surfaces 36, 36a are joined by a surface 37 to define an aperture 38, As shown in FIGURE 4b, when the select bar 17 is rotated in the direction of the arrow 18 (see FIGURE 1), the base 25 of the L-shaped member 20 moves the finger member 16 parallel to the surface 22 to its operated position close to or against the inside surface of the projection 24 of the card 12.

Figure 4C:
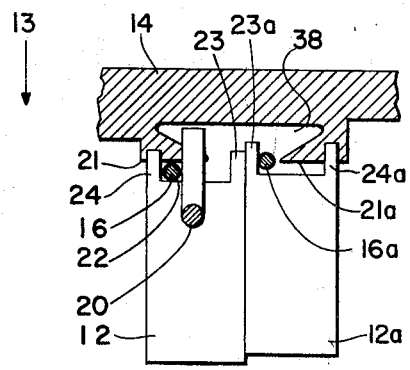
Figure 4D:
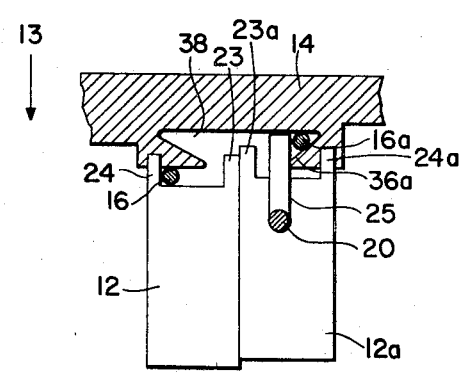

As shown in FIGURE 4c, subsequent movement of the actuator 14 in the direction of the arrow 13 to its operated position traps the operated finger member 16 between surfaces 21 and 22 causing the card 12 to move to its operated position, thereby operating its asociated crosspoint. It is to be noted that the surface 21a of the actutaor 14 passes by the unoperated finger member 16a without engaging it, with the finger 16a occupying the aperture 38. The L-shaped member 20 may then be returned to its unoperated position.

Rotation of the select bar 17 in the direction of the arrow 19, while the actuator 14 is still operated (see FIGURE 4d), causes the base 25 of the member 20 to move the finger member 16a parallel to the surface 36a in the aperture 38.

Upon return of the actuator 14 to its unoperated position, the operated finger member 16 is released and strikes the inside surface of the projection 23 without engaging the member 20 to provide effective damping of any vibration of the finger member 16.

The novel crosspoint actuating cards 12, 12a according to this invention are shown in detail in the views of FIGURE 5. The cards are made of insulated material and in side view (see FIGURE 5c), take a generally trapezoidal shape. A number of parallel-spaced-apart teeth 32 extend across the top surface of the cards 12, 12a for containing the movable contact springs 26. The U-shaped channels formed by the projections 23, 24 of card 12 and 23a, 24a of card 12a extend from the front of the cards. The back surface 40 of the cards slopes away from the top to the bottom surface of the trapezoid to allow for free movement of the card from front to back with clearance from other adjacent structure. A pair of projections 41 and 42 extend from the front and back respectively of the card for securing the retaining spring 30 and the restoring of spring 31. The restoring spring 31 is tensioned against rounded section 43 of the projection 42 to control the spring tension more effectively. Surface 44 of the card serves as a stop for the back-stop strip 29¹ (see FIGURE 3).

Lateral movement of the cards 12, 12a is kept to a minimum by making the sides of the projection 41 taper outwardly from the front to the back of the card. This ensures a close fit of the retaining spring 30 over the projection 41. However, the cards 12, 12a are not rigidly mounted and this fact helps to dampen the vibration when the finger members 16 strike the projections 23.

In the card 12, the projections 23 and 24 are parallel to each other and are in the same plane (see FIGURE 5d). As shown in FIGURE 5f, however, the projections 23a, and 24a of the card 12a, although parallel to each other, are displaced in different planes. Surface 45 at the side of card 12a extends from projection 23a and slopes toward projection 24a to the cards to advantageously occupy a minimum amount of space as best shown in FIGURES 1 and 2, with projection 23 of the card 12 slightly overlapping the projection 23a of the card 12a.

Thus, applicant has provided a novel crosspoint actuating device for a crossbar switch which provides improved vibration damping for the finger members; which utilizes a minimum amount of space; and, which permits manufacturing adjustments on a sub-assembly basis.

What is claimed is:

1. In a crosspoint actuating device for a crossbar switch comprising:
   (a) first and second crosspoints;
   (b) first and second crosspoint actuating cards one associated with each crosspoint, each card having an unoperated and an operated position and being movable to its operated position to operate its associated crosspoint;
   (c) an actuator having an unoperated and an operated position and being movable to its operated position toward the cards;
   (d) support means and first and second elongated, resilient finger members each having one end supported by the support means with their shanks being interposed between the actuator and the cards; one finger member being associated with each card;
   (e) a movable bar mounted independently of the finger members and being arranged to rotate about its longitudinal axis in opposite directions from an unoperated position to first and second operated positions;
   (f) an elongated rigid member having one end attached to the bar to rotate with rotation of the bar;
   (g) each finger member having an unoperated and an operated position and being movable in opposite directions to their respective operated positions;
   (h) the free end of the rigid member being interposed between the finger members such that each finger member is flexed to its operated position by the rigid member when the bar is rotated to its respective operated positions;
   (i) the actuator and the cards each having surface means for cooperation with the finger members such that movement of the actuator to its operated position, when either of the finger members is in its operated position, will trap the operated finger member between its associated card and the actuator to cause the card to move to its operated position;
   wherein the improvement comprises:
   (j) a first stop member integral with each card and facing the actuator;
   (k) each finger member, when in its unoperated position, being tensioned against the stop member of its associated card such that the finger members extend in separated substantially parallel relation;
   (l) the free end of the rigid member being disposed between the finger members in spaced relation when the bar is in its unoperated position;
   (m) whereby when either finger member moves from its operated to its unoperated position, it strikes its associated stop member without engaging rigid member, each stop member thereby damping the tendency of its associated finger member to vibrate.

2. A device as defined in claim 1 including a second stop member integral with each card and facing the actuator, each second stop member being disposed in spaced parallel relation to its associated first stop member, each second stop member determining the extent of movement of its associated finger member to its operated position.

3. A device as defined in claim 2 wherein the first and second stop members of each card comprises elongated parallel projections extending from the card toward the actuator, a flat surface joins the projections of each card at right angles to form a U-shaped channel facing the actuator; each finger member is located to move between its unoperated and operated positions parallel to, but spaced from, the flat surface of its associated card between the projections; the surface means of the actuator comprises a flat surface parallel to and facing the flat surface of each card in a plane parallel to but displaced from, the projections; each finger member is trapped between the flat surfaces of the actuator and its associated card when the finger member is in its operated position and the actuator is then moved from its unoperated to its operated position; the associated finger members, crosspoints, actuator and cards form part of the same vertical unit of the crossbar switch, whereby the location of the finger members with respect to the cards and actuator can be adjusted on a sub-assembly basis.

4. A device as defined in claim 3 wherein the first and second projections of one card are in the same plane, the first and second projections of the other card are in a different plane, the first projection of the cards being located in spaced overlapping relation, thereby minimizing the space occupied by the cards.

5. A device as defined in claim 3 wherein the rigid member is substantially L-shaped, with the base of the L being located in spaced relation between the finger members near their free ends when the movable bar is in its unoperated position.

6. An insulated crosspoint actuating card for use in a crosspoint actuating device of a crossbar switch, the card comprising:

an elongated member having spaced-apart teeth extending across its length at substantially right angles to define walls for containing movable contact springs;

a first projection extending from one end of the card parallel to its longitudinal axis and having an inner side against which an elongated resilient finger member in its unoperated position is tensioned;

means at each end of the card for movably mounting the card in the actuating device;

a second projection extending from the said one end in spaced parallel relation to the first projection, the projections being arranged to determine the extent of travel of the said finger member in its operated position;

a flat surface at the said one end joining the projections at right angles to form a U-shaped channel, the open side of which faces the said one end, the projections being in different planes, and including a surface at one side of the card extending from one projection and sloping toward the other projection.

References Cited

UNITED STATES PATENTS

| | | | |
|---|---|---|---|
| 2,117,702 | 5/1938 | Burwell | 200—177 |
| 2,936,340 | 5/1960 | Bernutz | 200—175 |
| 3,226,518 | 12/1965 | Kobus. | |
| 3,364,447 | 1/1968 | Peek | 335—112 |
| 3,396,351 | 8/1968 | Callender | 335—113 |
| 3,366,901 | 1/1968 | Keller | 335—112 |

FOREIGN PATENTS 923,557 12/1954 Germany.

ROBERT K. SCHAEFER, Primary Examiner

ROBERT A. VANDERHYE, Assistant Examiner

U.S. Cl. X.R.

200—166, 175; 335—112